(12) United States Patent
Amano et al.

(10) Patent No.: US 9,262,104 B2
(45) Date of Patent: Feb. 16, 2016

(54) INFORMATION PROCESSING APPARATUS, IMAGE PROCESSING APPARATUS, AND INFORMATION PROCESSING SYSTEM

(71) Applicant: FUJI XEROX CO., LTD., Minato-ku, Tokyo (JP)

(72) Inventors: Yasushi Amano, Kanagawa (JP);
Kohshiro Inomata, Kanagawa (JP);
Fumihisa Suzuki, Kanagawa (JP);
Yosuke Kinoshita, Kanagawa (JP);
Hirochika Shionoiri, Kanagawa (JP)

(73) Assignee: FUJI XEROX CO., LTD, Tokyo (JP)

( * ) Notice: Subject to any disclaimer, the term of this patent is extended or adjusted under 35 U.S.C. 154(b) by 0 days.

(21) Appl. No.: 14/261,067

(22) Filed: Apr. 24, 2014

(65) Prior Publication Data

US 2015/0055155 A1    Feb. 26, 2015

(30) Foreign Application Priority Data

Aug. 23, 2013   (JP) .................. 2013-173800

(51) Int. Cl.
| | |
|---|---|
| *G06K 15/02* | (2006.01) |
| *G06F 3/12* | (2006.01) |
| *H04N 1/44* | (2006.01) |
| *G06F 17/24* | (2006.01) |

(52) U.S. Cl.
CPC ............ *G06F 3/1222* (2013.01); *G06F 3/1238* (2013.01); *G06F 17/243* (2013.01); *H04N 1/44* (2013.01)

(58) Field of Classification Search
None
See application file for complete search history.

(56) References Cited

U.S. PATENT DOCUMENTS

| | | | |
|---|---|---|---|
| 2010/0134840 A1* | 6/2010 | Abe .............................. | 358/1.15 |
| 2012/0185240 A1* | 7/2012 | Goller et al. .................. | 704/201 |
| 2013/0024769 A1* | 1/2013 | Sumida et al. ................. | 715/255 |
| 2014/0355069 A1* | 12/2014 | Caton et al. ................... | 358/3.28 |

FOREIGN PATENT DOCUMENTS

| | | |
|---|---|---|
| JP | 2001-339535 A | 12/2001 |
| JP | 2006-050060 A | 2/2006 |
| JP | 2008-177825 A | 7/2008 |

* cited by examiner

*Primary Examiner* — Helen Q Zong
(74) *Attorney, Agent, or Firm* — Sughrue Mion, PLLC

(57) ABSTRACT

An information processing apparatus includes a first replacing unit, an obtaining unit, and a second replacing unit. The first replacing unit replaces, in first document data including plural character strings, a first character string which satisfies a predetermined condition by a second character string including a character string which is not included in the first document data so as to generate second document data. The obtaining unit obtains a processing result generated by processing the second document data. The second replacing unit replaces the second character string included in the processing result by a character string corresponding to the first character string.

11 Claims, 13 Drawing Sheets

| NUMBER | CONDITION |
|---|---|
| 1 | Mr. * |
| 2 | Ms. * |
| 3 | SUZUKI |
| 4 | SATO ICHIRO |
| 5 | * Corporation |
| 6 | * Ltd. |
| 7 | $\d{1,3}(,\d{3})* |
| 8 | Product "*" |
| : | : |

R1

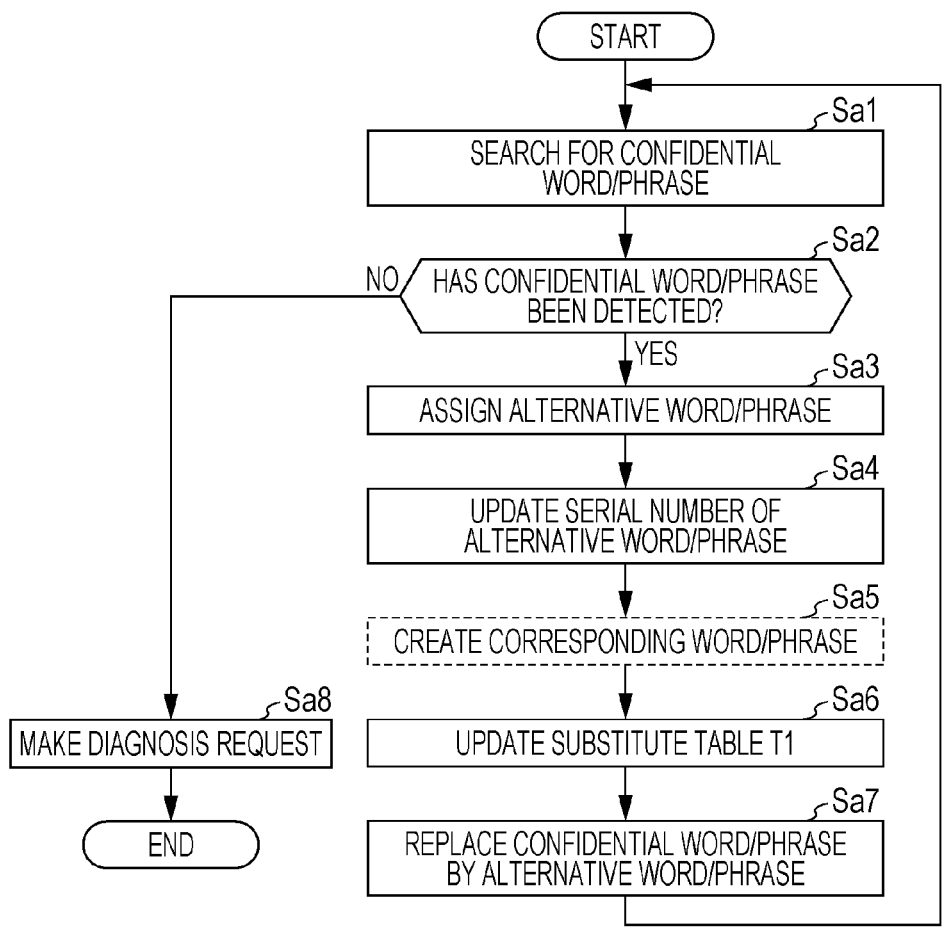

FIG. 9A
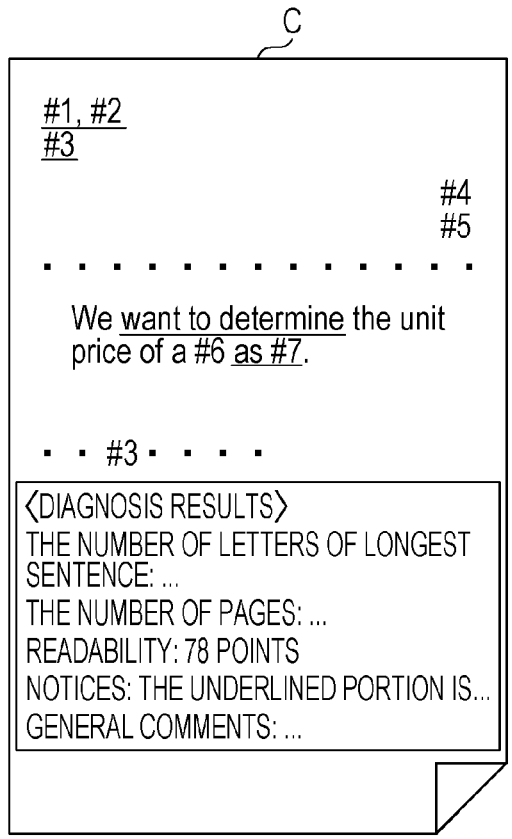
FIG. 9B
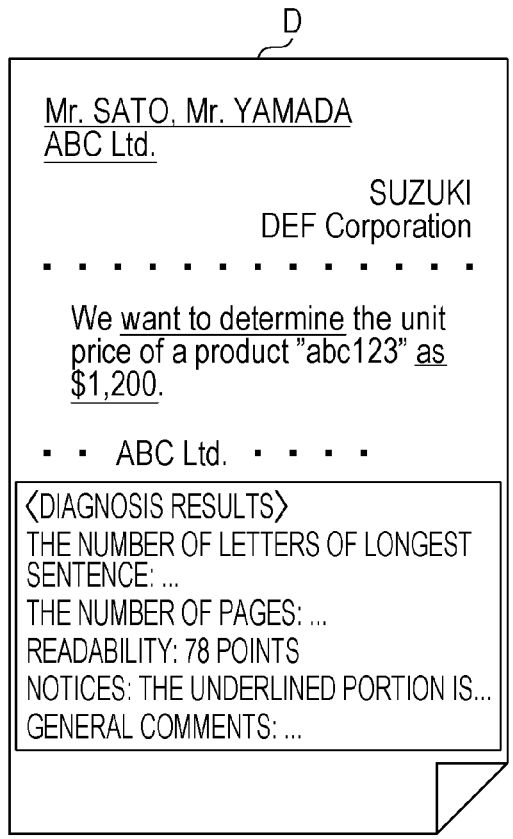
FIG. 10
| NUMBER | ORIGINAL TEXT NAME |
|---|---|
| ⋮ | ⋮ |
| 213 | A213 |
| 214 | A214 |
| 215 | A215 |
| ⋮ | ⋮ |
A213
| CONFIDENTIAL WORD/PHRASE | ALTERNATIVE WORD/PHRASE | CORRESPONDING WORD/PHRASE |
|---|---|---|
| (Kabu)-ABC | #1 | ABC Ltd. |
| SATO-sama | #2 | Mr. SATO |
| YAMADA-sama | #3 | Mr. YAMADA |
| DEF Kabushiki Kaisha | #4 | DEF Corporation |
| SUZUKI | #5 | SUZUKI |
| Seihin "abc 123" | #6 | Product "abc 123" |
| $1,200 | #7 | $1,200 |
| ⋮ | ⋮ | ⋮ |

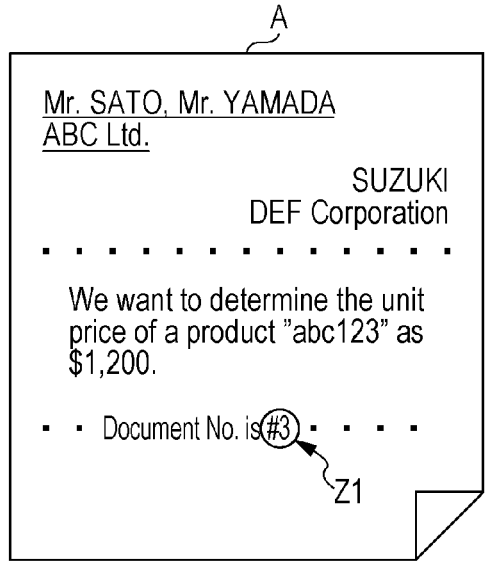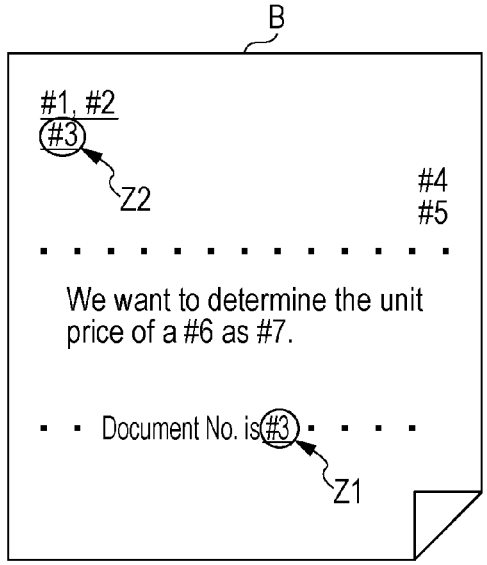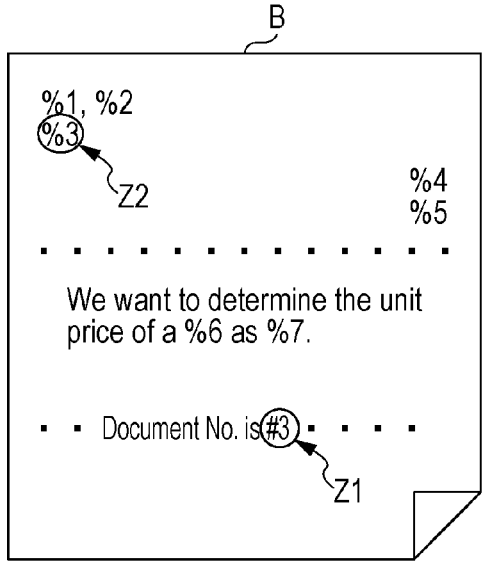

| CONDITION FOR CONFIDENTIAL WORD/PHRASE | CANDIDATE FOR ALTERNATIVE WORD/PHRASE | TRANSLATED WORD/PHRASE OF ALTERNATIVE WORD/PHRASE |
|---|---|---|
| *sama<br>*dono<br>SUZUKI<br>SATO ICHIRO<br>⋮ | ABE-san<br>KATO-san<br>SATO-san<br>TANAKA-san<br>⋮ | Mr. ABE<br>Mr. KATO<br>Mr. SATO<br>Mr. TANAKA<br>⋮ |
| (Kabu)*<br>*Kabushiki Kaisha | ABC Kabushiki Kaisha<br>DEF Kabushiki Kaisha<br>GHI Kabushiki Kaisha<br>JKL Kabushiki Kaisha | ABC Incorporated Company<br>DEF Incorporated Company<br>GHI Incorporated Company<br>JKL Incorporated Company |
| ⋮ | ⋮ | ⋮ |

| CONFIDENTIAL WORD/PHRASE | ALTERNATIVE WORD/PHRASE | TRANSLATED WORD/ PHRASE OF ALTERNATIVE WORD/PHRASE | CORRESPONDING WORD/PHRASE |
|---|---|---|---|
| (Kabu)ABC | JKL Kabushiki Kaisha | JKL Incorporated Company | ABC Ltd. |
| SATO-sama | ABE-san | Mr. ABE | Mr. SATO |
| DEF Kabushiki Kaisha | GHI Kabushiki Kaisha | GHI Incorporated Company | DEF Corporation |
| SUZUKI | KATO-san | Mr. KATO | SUZUKI |
| Seihin "abc 123" | Seihin "O-No. 1" | Product "O-No.1" | Product "abc123" |
| $1,200 | 7,777 yen | ¥7,777 | $1,200 |
| YAMADA-san | TANAKA-san | Mr. TANAKA | Mr. YAMADA |

INFORMATION PROCESSING APPARATUS, IMAGE PROCESSING APPARATUS, AND INFORMATION PROCESSING SYSTEM

CROSS-REFERENCE TO RELATED APPLICATIONS

This application is based on and claims priority under 35 USC 119 from Japanese Patent Application No. 2013-173800 filed Aug. 23, 2013.

BACKGROUND

Technical Field

The present invention relates to an information processing apparatus, an image processing apparatus, and an information processing system.

SUMMARY

According to an aspect of the invention, there is provided an information processing apparatus including a first replacing unit, an obtaining unit, and a second replacing unit. The first replacing unit replaces, in first document data including plural character strings, a first character string which satisfies a predetermined condition by a second character string including a character string which is not included in the first document data so as to generate second document data. The obtaining unit obtains a processing result generated by processing the second document data. The second replacing unit replaces the second character string included in the processing result by a character string corresponding to the first character string.

BRIEF DESCRIPTION OF THE DRAWINGS

An exemplary embodiment of the present invention will be described in detail based on the following figures, wherein:

FIG. 5 illustrates an example of a substitute table used in this exemplary embodiment;

FIG. 6 is a flowchart illustrating an operation including confidential word/phrase substitute processing until an image processing apparatus requests a diagnosis server to perform diagnosis processing;

FIGS. 9A and 9B illustrate how a diagnosed text changes as a result of executing alternative word/phrase substitute processing;

FIG. 10 illustrates an example of a substitute table used in a modified example;

FIGS. 14A through 14C illustrate an example of an influence produced on a sending text if alternative word/phrase check processing is not executed;

FIG. 15 illustrates an example of a substitute rule base used in a modified example;

FIG. 16 illustrates an example of a word/phrase table used in a modified example;

DETAILED DESCRIPTION

Figure 1:
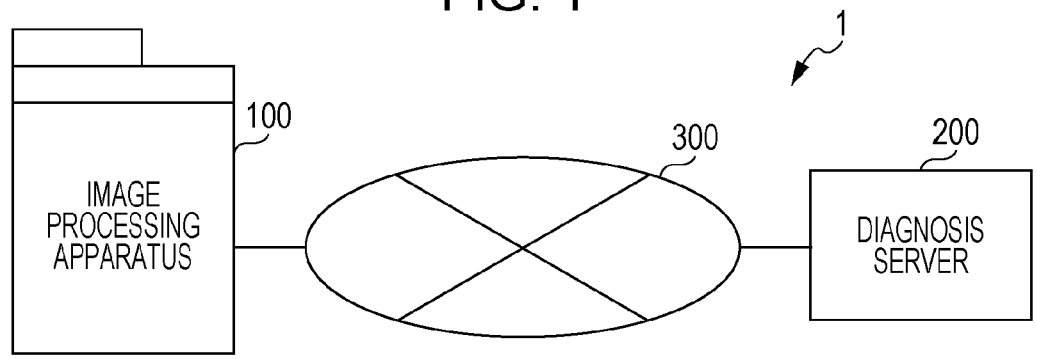
FIG. 1 illustrates an example of the configuration of an information processing system according to an exemplary embodiment of the present invention.

1. Exemplary Embodiment 1-1. Overall Configuration of Information Processing System FIG. 1 illustrates an example of the configuration of an information processing system 1 according to an exemplary embodiment of the present invention. An image processing apparatus 100, which serves as an information processing apparatus of this exemplary embodiment, has a diagnosis request function, as well as copy, scanner, printer functions. The image processing apparatus 100 is connected to a diagnosis server 200, which is an external device, via the Internet 300. The diagnosis server 200 is a server which is specially used for performing diagnostic processing for checking the correctness and readability of text. The diagnosis server 200 has a function of receiving data of an original text from the image processing apparatus 100, which is a client apparatus, and modifying the original text and returning the text to the image processing apparatus 100 as a diagnosed text. For the sake of simple representation, only one image processing apparatus 100 and only one diagnosis server 200 are shown in FIG. 1. However, the information processing system 1 may include plural image processing apparatuses 100 and plural diagnosis servers 200.

1-2. Functional Configuration of Image Processing Apparatus

Figure 2:
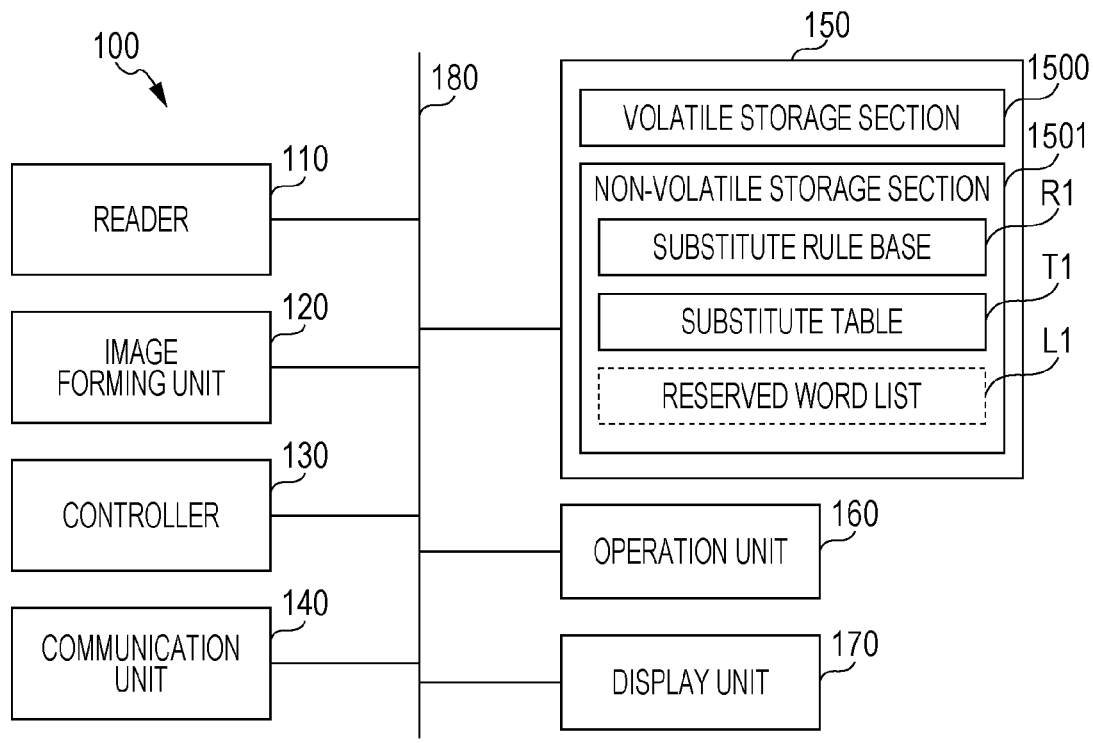
FIG. 2 illustrates an example of the functional configuration of an image processing apparatus.

FIG. 2 illustrates an example of the functional configuration of the image processing apparatus 100. The image processing apparatus 100 includes a reader 110 which reads an image formed on a document, an image forming unit 120 which forms an image on a sheet (medium) in accordance with given image data, a communication unit 140 through which the image processing apparatus 100 communicates with an external device, a storage unit 150, an operation unit 160, a display unit 170, and a controller 130 which controls these elements via a bus 180.

The storage unit 150 includes, as shown in FIG. 2, a volatile storage section 1500 and a non-volatile storage section 1501. The volatile storage section 1500 is a storage device, for example, a random access memory (RAM), in which the storage content is erased when power supply is terminated. The volatile storage section 1500 is used as a work area under the control of the controller 130, which operates in accordance with software. On the other hand, the non-volatile storage section 1501 is a storage device, for example, a hard disk, in which the storage content is not erased even when power supply is terminated, and stores therein a substitute rule base R1 and a substitute table T1 used in this exemplary embodiment. The non-volatile storage section 1501 also stores therein a diagnosis request program for executing diagnosis request processing of this embodiment.

The controller 130 is, for example, a central processing unit (CPU), and causes the image processing apparatus 100 to serve as a scanner by outputting image data read by the reader 110 to an external device from the communication unit 140. The controller 130 also causes the image processing apparatus 100 to serve as a copying machine by outputting an image represented by image data read by the reader 110 from the image forming unit 120. The controller 130 also causes the image processing apparatus 100 to serve as a printer by outputting an image represented by data input from an external source from the image forming unit 120.

In the following description, "a word/phrase" is a unit of a character string that can be recognized as a word/phrase, for example, a character string partitioned by a tab or a blank character, with a delimiter. "Words/phrases" may be words that are separated by performing morphological analysis processing on a character string. In this case, among the separated words, "words/phrases" may be words, except for words that are classified as postpositional particles (such as those in the Japanese language).

1-3. Functional Configuration of Controller

Figures 3, 4:
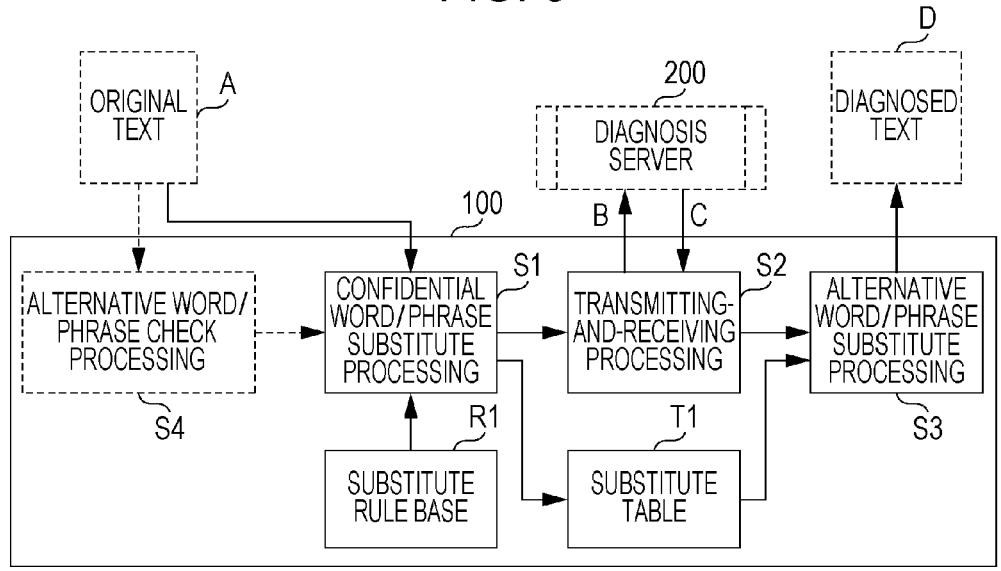
FIG. 3 is a conceptual diagram illustrating an overview of diagnosis request processing executed by a controller.
FIG. 4 illustrates an example of a substitute rule base used in this exemplary embodiment.

A function of the controller 130 unique to this exemplary embodiment is a diagnosis request function. FIG. 3 is a conceptual diagram illustrating an overview of diagnosis request processing executed by the controller 130.

In confidential word/phrase substitute processing S1, by referring to a substitute rule base R1 (see FIG. 4, details will be given later) stored in the non-volatile storage section 1501, confidential words/phrases in an original text A are replaced by associated alternative words/phrases, and also, a substitute table T1 in which the confidential words/phrases are associated with alternative words/phrases (see FIG. 5, details will be given later) is generated. In this case, a confidential word/phrase is a word/phrase which satisfies a predetermined condition, and an alternative word/phrase is a word/phrase which is not included in the original text A. That is, a confidential word/phrase is an example of a first character string in an exemplary embodiment of the present invention, while an alternative word/phrase is an example of a second character string in an exemplary embodiment of the present invention.

In transmitting-and-receiving processing S2, text obtained by replacing confidential words/phrases in the original text A by associated alternative words/phrases is transmitted to the diagnosis server 200 via the communication unit 140 as a sending text B. In the transmitting-and-receiving processing S2, the diagnosis server 200 checks the correctness and readability of sentences included in the sending text B, and the image processing apparatus 100 receives obtained results (diagnosis results) via the communication unit 140 as a received text C. In alternative word/phrase substitute processing S3, by referring to the substitute table T1 stored in the non-volatile storage section 1501, alternative words/phrases included in the received text C are replaced by associated confidential words/phrases. Then, the controller 130 causes the image forming unit 120 to output a diagnosed text D obtained by executing alternative word/phrase substitute processing S3. The above-described processing operations are executed as a result of the controller 130 of the image processing apparatus 100 reading the diagnosis request program stored in the non-volatile storage section 1501.

FIG. 4 illustrates an example of the substitute rule base R1 used in this exemplary embodiment. As shown in FIG. 4, the substitute rule base R1 is a set of conditions for confidential words/phrases. Words/phrases that satisfy any one of the conditions included in the substitute rule base R1 are determined to be confidential words/phrases. Each condition is appended with a number. A condition may be a word/phrase which represents a smallest meaningful unit including a key word/phrase, for example, "Mr." "department", "corporation", or "yen, for specifying a personal name, a company name, or a price (hereinafter such a word/phrase will be referred to as a "minimum-meaningful-unit word/phrase"). For example, a minimum-meaningful-unit word/phrase including a key word/phrase "Mr." is a personal name, such as "Mr. Suzuki" or "Mr. Tanaka", and is thus a confidential word/phrase. For enabling the detection of a confidential word/phrase of this type, a key word/phrase, such as "Mr.", is defined in a "condition" field.

Note that "*" indicated in the "condition" field is a so-called wildcard, which represents a character string constituted by characters other than delimiters. Confidential words/phrases may include words/phrases without key words/phrases. For example, a minimum-meaningful-unit word/phrase constituted by numeric values which are arranged according to a certain rule, for example, a date, such as "Jan. 1, 2005", is also a confidential word/phrase. For enabling the detection of a confidential word/phrase of this type, a rule for the arrangement of numeric values is also defined in the "condition" field. Additionally, personal names and place names without prefixes or suffixes are also confidential words/phrases. For enabling such words/phrases to be specified as confidential words/phrases, a dictionary of personal names, a dictionary of place names, and so on, are embedded in the "condition" field.

Conditions included in the substitute rule base R1 may be so-called regular expressions. For example, "\$\d{1, 3}(, \d{3})*" represents regular expressions indicating conditions that the first character is "\$", and any number repeats one time to three times, and then, a group of a comma and three numeric characters is repeated at least 0 times. In these regular expressions, "\d" is a so-called escape sequence representing any number, "{n, m}" is a regular expression indicating that a character immediately before is repeated n to m times, and {n} is a regular expression indicating that a character immediately before is repeated n times. The parenthesis indicates that the portion inside the parenthesis is formed into a group, and "*" indicates that the character or the group immediately before is repeated at least 0 times. By these regular expressions, words/phrases indicating prices in dollars, such as "\$1,200" and "\$12,345,678", may be detected. In the substitute rule base R1, conditions indicating telephone numbers, email addresses based on RFC (Request for Comments) 5322, or URI (Uniform Resource Identifier) based on RFC 3986 may be included.

FIG. 5 illustrates an example of the substitute table T1 of this exemplary embodiment. The substitute table T1 includes an original text name list T10 and a word/phrase table T11. In the original text name list T10, names for identifying received original texts A (hereinafter referred to as "original text names") which are appended with numbers in order in which they are received are described. The word/phrase table T11 is a table generated for each of the original text names described in the original text name list T10, and is constituted by a set of records, each including a field of "confidential word/phrase" detected from an original text A indicated by each original text name on the basis of the substitute rule base R1 and a field of "alternative word/phrase" which replace these confidential words/phrases.

Among word/phrase tables T11 included in the substitute table T1, the controller 130 specifies a word/phrase table T11 associated with the original text name of the original text A. The controller 130 then searches the original text A for a confidential word/phrase which satisfies one of the conditions included in the substitute rule base R1. The controller 130 then assigns, as an alternative word/phrase, a word/phrase constituted by a reserved word and a serial number, which are determined in advance, to a detected confidential word/phrase, and fills the assigned alternative word/phrase in the word/phrase table T11. If plural confidential words/phrases are included in the original text A, an alternative word/phrase constituted by the reserved word and a different serial number is assigned to each of the confidential words/phrases. In this case, for example, if the reserved word is "#", it is combined with each of serial numbers 1, 2, 3, and so on, and alternative words/phrases "#1", "#2", "#3", and so on, are assigned to the individual confidential words/phrases. The reserved word is determined in advance such that an alternative word/phrase obtained by combining such a reserved word with a serial number will not be changed by the diagnosis server 200. The controller 130 may determine an alternative word/phrase so that the alternative word/phrase will not influence the readability diagnosis conducted by the diagnosis server 200. For example, if the number of letters of a sentence counts toward the readability diagnosis, the controller 130 may adjust the number of letters of an alternative word/phrase to be assigned to a detected confidential word/phrase so that the number of letters of the alternative word/phrase will be the same as that of the confidential word/phrase. More specifically, if the detected confidential word/phrase is "Mr. Tanaka", the number of letters is nine. Accordingly, the controller 130 may generate an alternative word/phrase "#1#######" by adding the reserved word "#" at the end of the original alternative word/phrase "#1" so that the number of letters of the alternative word/phrase will be nine. Alternatively, the controller 130 may count the number of letters of each confidential word/phrase. The controller 130 may then create a table in which alternative words/phrases assigned to the individual confidential words/phrases are associated with the counted numbers of letters, and then send this table to the diagnosis server 200. In this case, the diagnosis server 200 uses the received table for diagnosis processing.

The controller 130 replaces all the confidential words/phrases included in the original text A by the alternative words/phrases included in the word/phrase table T11 assigned to these confidential words/phrases so as to generate a sending text B.

1-4. Operation of Information Processing System

A description will now be given of an operation performed by the information processing system 1 according to this exemplary embodiment. In the following example, two operations will be separately described. In a first operation, a user causes the image processing apparatus 100 to read a document on which a recorded text is printed on paper, and the image processing apparatus 100 performs the confidential word/phrase substitute processing S1 and sends a replaced text (sending text B) to the diagnosis server 200, thereby requesting the diagnosis server 200 to perform diagnosis processing. In a second operation, the image processing apparatus 100 receives a modified text (received text C) which describes diagnosis results in response to the sending text B from the diagnosis server 200, performs alternative word/phrase substitute processing S3, and prints the obtained diagnosed text on paper (medium).

Figure 7A:
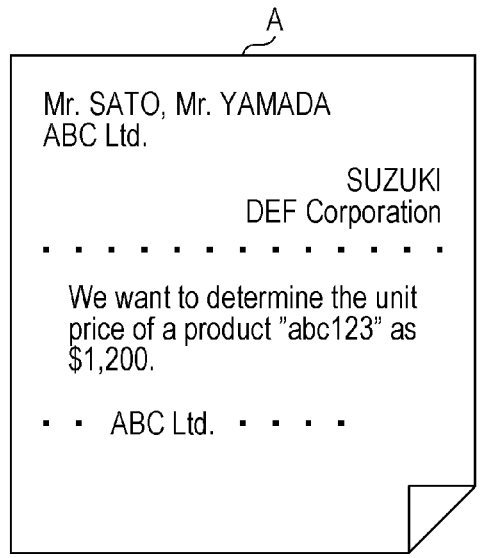
FIGS. 7A and 7B illustrate how an original text changes as a result of executing confidential word/phrase substitute processing.
Figure 7B:
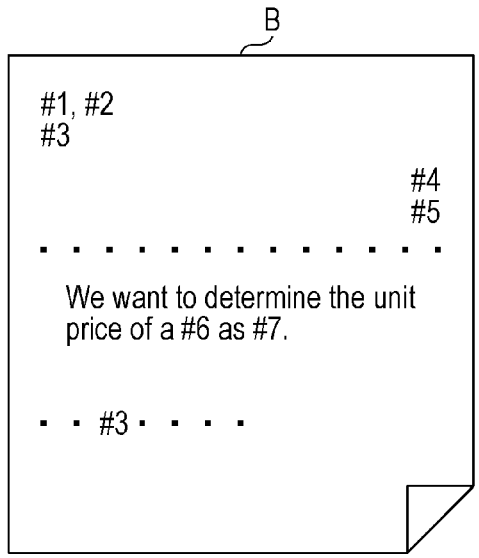

(1) Operation Performed by the Image Processing Apparatus 100 Until Making a Request for Diagnosis Service FIG. 6 is a flowchart illustrating an operation including confidential word/phrase substitute processing S1 performed by the image processing apparatus 100 until it makes a request for a diagnosis service. FIGS. 7A and 7B illustrates how an original text changes as a result of executing confidential word/phrase substitute processing S1. First, a user sets documents on which text written in, for example, English is printed in an automatic document feeder (not shown) provided in the reader 110 of the image processing apparatus 100. The user then operates, for example, a touch panel, of the operation unit 160 to display a menu screen. When the user selects and sets "diagnosis" from a menu, a screen for setting details of diagnosis is displayed on the display unit 170. The user operates the operation unit 160 to determine whether to perform confidential word/phrase substitute processing, and if it is performed, the user may specify the language of original text and the type of diagnosis. On this screen, the user may be able to specify a diagnosis server 200 which will perform diagnosis processing from among plural diagnosis servers 200. In this exemplary embodiment, it is assumed that the user has selected that "confidential word/phrase substitute processing S1" will be performed and specified "English" as the language of original text and "readability diagnosis" as the type of diagnosis.

When the user presses a start button in the operation unit 160, the controller 130 feeds the documents set in the automatic document feeder of the reader 110 one by one to a reading position, and outputs an instruction to scan the documents. As a result, the documents are read by the reader 110 one by one, so that image data representing images read from the documents is generated.

Then, the controller 130 performs character recognition processing on the image data and stores, as the original text A, data which is recognized by this character recognition processing (hereinafter such data will be referred to as "document data") as character strings forming the documents, in the volatile storage section 1500.

Then, the controller 130 refers to the substitute rule base R1 and performs confidential word/phrase substitute processing S1 (FIG. 6) on the original text A stored in the volatile storage section 1500. FIG. 7A illustrates an example of the original text A which has not been subjected to confidential word/phrase substitute processing S1.

Confidential word/phrase substitute processing S1 is performed on the original text A in the following manner. First, in step Sa1, the controller 130 searches for a confidential word/phrase which satisfies one of the conditions included in the substitute rule base R1 (FIG. 4). It is then determined in step Sa2 whether a confidential word/phrase has been detected. If the result of step Sa2 is NO, the process proceeds to step Sa8. In step Sa8, the controller 130 sends document data indicating the original text A to the diagnosis server 200 as a sending text B, and requests the diagnosis server 200 to perform diagnosis processing on this sending text B.

On the other hand, if the original text A includes a confidential word/phrase, such as "ABC Ltd." shown on the top left corner of FIG. 7A, which contains a key word/phrase, such as "Ltd.", and if this key word/phrase is included in the substitute rule base R1 as one of the conditions for specifying confidential words/phrases, the result of step Sa2 is YES. In this case, the process proceeds to step Sa3. In step Sa3, the controller 130 stores this confidential word/phrase in the volatile storage section 1500. The controller 130 then assigns an alternative word/phrase constituted by a reserved word "#" and a serial number, which is an unused integer, to this confidential word/phrase, and temporarily stores the assigned alternative word/phrase in the volatile storage section 1500. When a confidential word/phrase is first detected as a result of conducting a search, an unused integer is 1. Accordingly, "#1" is assigned to this confidential word/phrase as an alternative word/phrase. Then, in step Sa4, the controller 130 updates the serial number used for an alternative word/phrase. In this exemplary embodiment, it is assumed that "#1" has been assigned to "ABC Ltd.", which has been first detected as a confidential word/phrase, as a result of executing steps Sa3 and Sa4.

Then, in step Sa6, the controller 130 associates the confidential word/phrase with the alternative word/phrase, which are temporarily stored in the volatile storage section 1500, as a new record, and adds the new record to the word/phrase table T11 associated with the original text name of the original text A, thereby updating the substitute table T1. That is, "ABC Ltd." and "#1" are written into the corresponding fields of a new record in the word/phrase table T11.

Then, in step Sa7, in accordance with the new record stored in the word/phrase table T11 associated with the original text A, the controller 130 replaces the confidential word/phrase included in the original text A by the alternative word/phrase in the new record. That is, the controller 130 replaces "ABC Ltd." by "#1".

After executing substitute processing in step Sa7, the routine returns to step Sa1. The controller 130 then searches for a confidential word/phrase in the document data indicating the original text A in which the detected confidential word/phrase has been replaced by the alternative word/phrase. Every time a confidential word/phrase has been detected in step Sa2, the controller 130 executes steps Sa3 through Sa7. If all the confidential words/phrases have been subjected to substitute processing, that is, if the result of step Sa2 is NO, the process proceeds to step Sa8. In step Sa8, the image processing apparatus 100 sends the substituted text to the diagnosis server 200 as a sending text B, thereby requesting the diagnosis server 200 to perform diagnosis processing. An example of the sending text B generated by executing confidential word/phrase substitute processing S1 is shown in FIG. 7B.

A description will now be given of an example of diagnosis processing concerning the readability of sentences performed by the diagnosis server 200.

When sending the sending text B (FIG. 7B) to the diagnosis server 200, the image processing apparatus 100 sends document data indicating the original text A, an ID specifying the image processing apparatus 100, and information concerning, for example, the language of the text. Upon receiving the document data, the diagnosis server 200 performs the specified type of diagnosis processing on the received document data so as to generate document data indicating a diagnosed text. In the diagnosis processing concerning the readability of sentences, sentences in the text are evaluated. For example, the number of letters or the number of words in a sentence is counted, and the sentence having the number of letters or the number of words which exceeds a threshold is determined to be a sentence which is hard to read. Additionally, the correctness concerning modification and dependency structures of sentences specified by morphological analysis processing is checked.

The diagnosis server 200 then sends the generated document data to the image processing apparatus 100 specified by the ID added to the request data.

The image processing apparatus 100 determines a reserved word in advance so that such a reserved word will not be changed by the diagnosis server 200. Accordingly, an alternative word/phrase (second character string) is a character sting that is not changed by processing performed by the diagnosis server 200 (server device). In this case, the same reserved word may be determined in advance by the image processing apparatus 100 and the diagnosis server 200. Alternatively, every time the image processing apparatus 100 requests the diagnosis server 200 to perform diagnosis processing, it may specify a reserved word. If the image processing apparatus 100 specifies a reserved word, the diagnosis server 200 may not check an alternative word, which is constituted by such a specified reserved word followed by a serial number, and may leave the alternative word in the diagnosed text.

(2) Operation by the Image Processing Apparatus 100 after Receiving Text Generated by the Diagnosis Server 200

Figure 8:
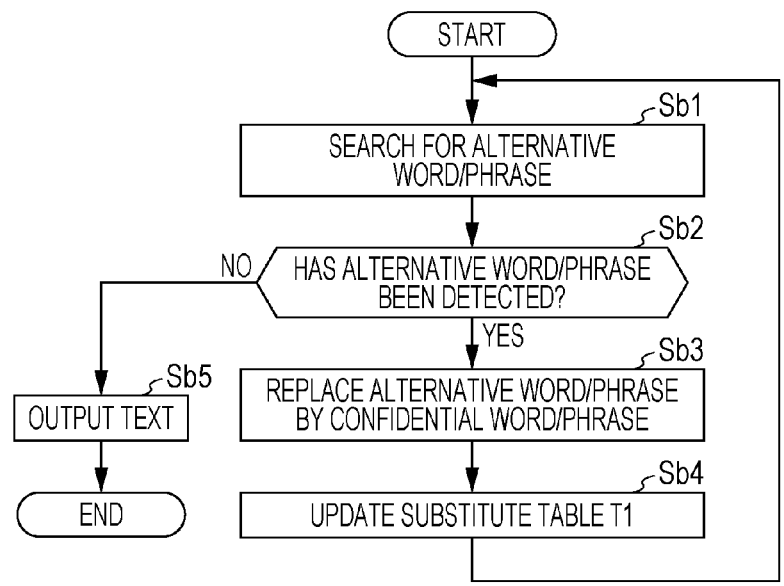
FIG. 8 is a flowchart illustrating an operation performed by the image processing apparatus including alternative word/phrase substitute processing after receiving a text generated by the diagnosis server.

FIG. 8 is a flowchart illustrating an operation including alternative word/phrase substitute processing S3 performed by the image processing apparatus 100 after receiving a text generated by the diagnosis server. FIGS. 9A and 9B illustrate how a diagnosed text changes as a result of executing alternative word/phrase substitute processing S3. Upon receiving document data which indicates a modified text from the diagnosis server 200, the image processing apparatus 100 stores this document data in the volatile storage section 1500 as a received text C. Then, the controller 130 of the image processing apparatus 100 reads the document data indicating the received text C from the volatile storage section 1500, and performs alternative word/phrase substitute processing S3 shown in FIG. 8. In this exemplary embodiment, a case in which alternative word/phrase substitute processing S3 is performed after document data indicating the received text C shown in FIG. 9A has been received and stored in the volatile storage section 1500 will be discussed.

In step Sb1, the controller 130 first specifies a word/phrase table T11 associated with the original text A, which is a base for the received text C, among the word/phrase tables T11 included in the substitute table T1. The controller 130 then searches the document data indicating the received text C for each of the alternative words/phrases stored in the specified word/phrase table T11. It is then determined in step Sb2 whether any of the alternative words/phrases stored in the specified word/phrase table T11 has been detected. If the result of step Sb2 is NO, the controller 130 terminates the substitute processing, and then proceeds to step Sb5. The controller 130 stores the document data in the volatile storage section 1500 as a diagnosed text D and outputs it. Images of the document data indicating the diagnosed text D output from the controller 130 are formed on a sheet (medium) by the image forming unit 120, and then, the images formed on the sheet (medium) are output.

On the other hand, if at least one of the alternative words/phrases stored in the word/phrase table T11 is included in the document data, the operation is performed in the following manner. In the example shown in FIG. 9A, there is a word/phrase "#1" that is included in the received text C, and "#1" is stored in the word/phrase table T11 as one of the alternative words/phrases. Accordingly, in step Sb2, the controller 130 detects "#1" as an alternative word/phrase. Then, in step Sb3, the controller 130 replaces the detected alternative word/phrase by an associated confidential word/phrase stored in the word/phrase table T11. That is, the controller 130 replaces all alternative words/phrases "#1" appearing in the diagnosed text by "ABC Ltd.". Then, in step Sb4, the controller 130 updates the word/phrase table T11 by deleting a record including the alternative word/phrase which has been replaced by the confidential word/phrase from the word/phrase table T11 or by rewriting a flag (not shown) and nullifying the record. Thereafter, every time an alternative word/phrase is detected in step Sb2, steps Sb3 and Sb4 are executed.

If all the alternative words/phrases have been subjected to steps Sb3 and Sb4, that is, if the result of step Sb2 is NO, the controller 130 terminates the substitute processing, and then proceeds to step Sb5. The controller 130 stores the document data in the volatile storage section 1500 as a diagnosed text D and outputs it. Images of the document data indicating the diagnosed text D output from the controller 130 are formed on a sheet (medium) by the image forming unit 120, and then, the images formed on the sheet (medium) are output. In this case, the diagnosed text D is printed and output, as shown in FIG. 9B, by the image processing apparatus 100. In the diagnosed text D, the confidential words/phrases which were replaced by the alternative words/phrases in the sending text B have reappeared, and the diagnosis results concerning the readability of sentences are added. For allowing a user to easily understand points to notice, the layout may be changed, for example, a portion to notice in the text may be underlined or the font may be changed.

2. Modified Examples

The exemplary embodiment discussed above may be modified as in the following modified examples. Additionally, the following modified examples may be combined.

2-1. First Modified Example

In the above-described exemplary embodiment, as a diagnosis request terminal, the image processing apparatus 100 is used. However, the diagnosis request terminal is not restricted to the image processing apparatus 100, and another device, such as a personal computer (PC), personal digital assistants (PDA), a cellular phone, a portable music player, a portable video player, a game machine, an e-book reader, or a navigator, may be used.

A network which interfaces between the image processing apparatus 100 and the diagnosis server 200 is not restricted to the Internet 300, and may be another network, such as a local area network (LAN) or a wide area network (WAN). Such a network may include partially or entirely a wireless area. An original text and a diagnosed text are not restricted to English, and may be applied to all languages.

2-2. Second Modified Example

In the above-described exemplary embodiment, when making a request for diagnosis processing by using the image processing apparatus 100, which serves as a diagnosis request terminal, a user selects confidential word/phrase substitute processing by using a touch panel. However, when requesting an external diagnosis server to perform diagnosis processing, confidential word/phrase substitute processing may be automatically executed.

2-3. Third Modified Example

In the above-described exemplary embodiment, a user requests an external diagnosis server to perform diagnosis processing by operating a touch panel by using the image processing apparatus 100, which serves as a diagnosis request terminal. Alternatively, a terminal, such as a PC or PDA, may be connected to the image processing apparatus 100 via a wired or wireless medium, and original text data to be diagnosed may be sent to the image processing apparatus 100. Then, the image processing apparatus 100 may perform confidential word/phrase substitute processing and send document data representing a sending text B to the external diagnosis server 200. In this case, by using the terminal, a user is able to specify whether to require confidential word/phrase substitute processing, and the terminal adds a flag indicating whether to require confidential word/phrase substitute processing to the original text data and sends it to the image processing apparatus 100. Then, the image processing apparatus 100 performs confidential word/phrase substitute processing on original text data with a flag indicating that confidential word/phrase substitute processing is required, and then requests the external diagnosis server 200 to provide a diagnosis service. Alternatively, the default of the flag indicating whether or not confidential word/phrase substitute processing is required may be constantly set to be "required", and when receiving a request to perform diagnosis processing, the image processing apparatus 100 may always perform confidential word/phrase substitute processing.

In the above-described exemplary embodiment, a diagnosed text D obtained by performing alternative word/phrase substitute processing S3 is output by using the image forming unit 120. Alternatively, a diagnosed text D may be output by using a display device provided in a terminal, such as a PC or PDA, connected to the image processing apparatus 100 via a wired or wireless medium.

2-4. Fourth Modified Example

In the above-described exemplary embodiment, the controller 130 of the image processing apparatus 100 searches for all confidential words/phrases stored in the substitute rule base R1 and replaces detected words/phrases by alternative words/phrases. However, confidential words/phrases to be replaced may be restricted in accordance with the level of confidentiality of a document to be diagnosed. For example, the levels of confidentiality are divided into three levels, such as "low", "intermediate", and "high", and multiple substitute rule bases R1 are stored in the non-volatile storage section 1501 in advance in accordance with the levels of confidentiality. For example, when the level of confidentiality of a document is "low", a "personal/corporate name" substitute rule base R1 is used, when the level of confidentiality of a document is "intermediate", "personal/corporate name" and "address" substitute rule bases R1 are used, and when the level of confidentiality of a document is "high", "personal/corporate name", "address", and "product (project) name" substitute rule bases R1 are used. Then, the user specifies one of the levels of confidentiality by using a touch panel of the operation unit 160, and the image processing apparatus 100 performs confidential word/phrase substitute processing in accordance with the specified level. Alternatively, items, such as "personal/corporate name", "address", "product (project) name", and "price", may be grouped and stored, and group names may be displayed on a screen for setting details of confidential word/phrase substitute processing. Then, the user may select "AND" or "OR" of these group names on the touch panel. Then, the image processing apparatus 100 may perform confidential word/phrase substitute processing concerning only a selected item.

The number of levels of confidentiality is not restricted to three, and may be two or four or more. The levels of confidentiality may include a level in which confidential word/phrase substitute processing is not performed.

The level of confidentiality may be specified by a user as described above; however, it may be associated with an original text A in advance. Alternatively, the level of confidentiality may be associated with identification information concerning a user who gives an instruction to perform confidential word/phrase substitute processing. In this case, a table in which user IDs of users (identification information) are associated with the levels of confidentiality is stored in the non-volatile storage section 1501. Then, after the user ID of a certain user is authenticated, the controller 130 of the image processing apparatus 100 refers to this table and specifies the level of confidentiality associated with this user. The image processing apparatus 100 then performs confidential word/phrase substitute processing in accordance with the specified level of confidentiality.

2-5. Fifth Modified Example

The image processing apparatus 100 by itself may have a diagnosis function. In this case, concerning sentences including confidential words/phrases, the image processing apparatus 100 may perform diagnosis processing, and concerning sentences without confidential words/phrases, the image processing apparatus 100 may request the external diagnosis server 200 to perform diagnosis processing. In this case, after receiving a modified text from the diagnosis server 200, the image processing apparatus 100 combines diagnosis results described in the modified text received from the diagnosis server 200 with diagnosis results of sentences subjected to diagnosis processing performed by the image processing apparatus 100.

2-6. Sixth Modified Example

In the above-described exemplary embodiment, the image processing apparatus 100 requests an external device to perform diagnosis processing. However, the type of processing requested by the image processing apparatus 100 may be another type of processing. For example, the image processing apparatus 100 may request an external device to perform translation processing for translating sentences written in a certain language into another language, difference processing for extracting different portions of two documents, or processing for calculating various statistics, such as the frequency of appearance of a certain word/phrase in sentences or the correlation between words/phrases. In this case, a server device which receives a request to perform processing is not restricted to the diagnosis server 200. Additionally, the output as a result of performing processing may be a set of character strings only, or may also include an element other than character strings, for example, a combination of character strings and graphics, such as tree diagrams. In short, data which is output as a result of performing processing by a server device may be any type of data as long as it includes a character string to be replaced.

A description will now be given of an example in which an image processing apparatus of an exemplary embodiment of the present invention requests an external server device to perform translation processing. Elements in this modified example are designated by reference numerals expressed by adding "a" to like reference numerals of the corresponding elements of the exemplary embodiment.

An information processing system 1a includes an image processing apparatus 100a, a translation server 200a, and the Internet 300a. The translation server 200a is a server which is specially used for performing translation processing for receiving original text data of a certain language from the image processing apparatus 100a, which is a client apparatus, and for translating the received text data into another language P different from the language of the text data.

In confidential word/phrase substitute processing S1, by referring to a substitute rule base R1a stored in a non-volatile storage section 1501a of a storage unit 150a, a controller 130a of the image processing apparatus 100a replaces confidential words/phrases in an original text A by alternative words/phrases, and also, generates a substitute table T1a in which the confidential words/phrases are associated with the alternative words/phrases. In this case, when generating the substitute table T1a in the confidential word/phrase substitute processing S1, in addition to the confidential words/phrases and alternative words/phrases, the controller 130a writes "corresponding words/phrases", which are words/phrases translated from the confidential words/phrases, into a word/phrase table T11a. More specifically, the controller 130a specifies translated words/phrases corresponding to the confidential words/phrases by referring to a dictionary (not shown), and writes the specified translated words/phrases into the word/phrase table T11a of the substitute table T1a as the corresponding words/phrases.

FIG. 10 illustrates an example of the substitute table T1a of this modified example. Unlike the word/phrase table T11 of the exemplary embodiment, the word/phrase table T11a included in the substitute table T1a has a field of the corresponding words/phrases in addition to fields of the confidential words/phrases and alternative words/phrases. The controller 130a specifies a word/phrase table T11a associated with the original text name of an original text A among word/phrase tables T11a included in the substitute table T1a. The controller 130a then searches the original text A for a confidential word/phrase that satisfies one of the conditions in the substitute rule base R1a, and assigns a word/phrase constituted by a predetermined reserved word and a serial number to the detected confidential word/phrase as an alternative word/phrase. At the same time, the controller 130a creates a word/phrase translated from the confidential word/phrase as a corresponding word/phrase, and associates the corresponding word/phrase with the confidential word/phrase.

For example, if the original text A includes a confidential word/phrase, such as "(Kabu)ABC" (which means "ABC Ltd." in English) shown on the top left corner of FIG. 7A, which contains a key word/phrase, such as "(Kabu)" (which means "Ltd." in English), and if this key word/phrase is included in the substitute rule base R1a as one of the conditions for specifying confidential words/phrases, the result of step Sa2 of FIG. 6 is YES. In this case, in step Sa3, the controller 130a stores this confidential word/phrase in the volatile storage section 1500a. The controller 130a then assigns an alternative word/phrase "#1" constituted by a reserved word "#" and a serial number 1, which is an unused integer, to this confidential word/phrase. Then, in step Sa4, the controller 130a updates the serial number used for an alternative word/phrase. Then, in step Sa5 indicated by the broken lines in FIG. 6, the controller 130a creates a corresponding word/phrase "ABC Ltd." translated from the above-described confidential word/phrase "(Kabu)ABC" by referring to a dictionary (not shown).

In the above-described example, the controller 130a creates a corresponding word/phrase by referring to a dictionary (not shown). Instead, the controller 130a may query a user of the image processing apparatus 100a about a word/phrase translated from the confidential word/phrase and may utilize an obtained word/phrase responded from the user as a corresponding word/phrase.

After creating the corresponding word/phrase, in step Sa6, the controller 130a associates the confidential word/phrase, the alternative word/phrase, and the corresponding word/phrase with one another, as a new record, and adds the new record to the word/phrase table T11a associated with the original text name of the original text A, thereby updating the substitute table T1a. That is, "(Kabu)ABC", "#1", and "ABC Ltd." are written into the corresponding fields of a new record in the word/phrase table T11a.

By updating the substitute table T1a in this manner, in step Sa7, the controller 130a replaces the confidential words/phrases in the original text A by the alternative words/phrases, thereby generating the sending text B shown in FIG. 7B. This sending text B is sent to the translation server 200a, and is subjected to translation processing by the translation server 200a. Then, upon receiving, as a received text C, translated text obtained as a result of performing translation processing on the sending text B by the translation server 200a, the image processing apparatus 100a performs alternative word/phrase substitute processing S3 on the received text C.

Figure 11A:
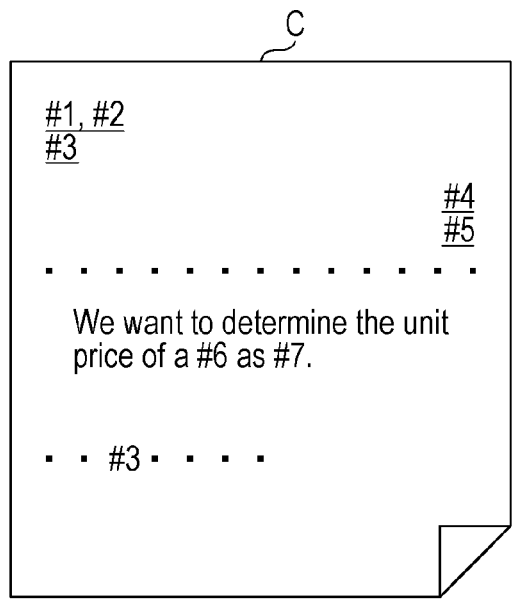
FIGS. 11A and 11B illustrate how a translated text changes as a result of executing alternative word/phrase substitute processing according to another modified example.
Figure 11B:
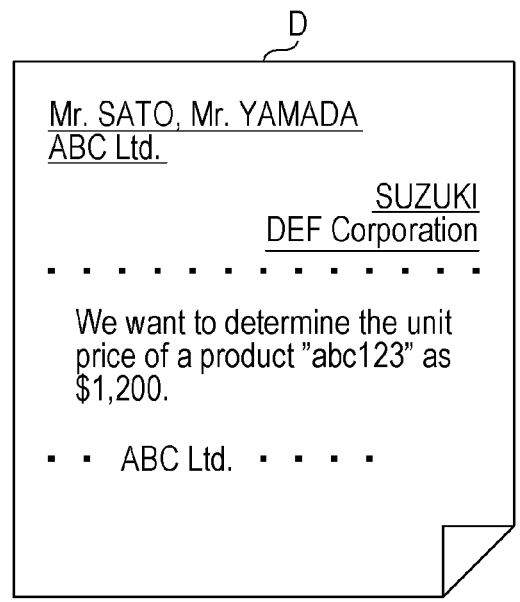

FIGS. 11A and 11B illustrate how a translated text changes as a result of executing alternative word/phrase substitute processing S3 in this modified example. As a result of performing translation processing on the sending text B written in Japanese, the translation server 200a sends the translated text shown in FIG. 11A to the image processing apparatus 100a. The image processing apparatus 100a then receives this translated text as a received text C. Then, the controller 130a of the image processing apparatus 100a searches for alternative words/phrases included in document data representing the received text C and replaces the detected alternative words/phrases by the corresponding words/phrases. As a result, the alternative words/phrases included in the received text C are replaced by the corresponding words/phrases, which are translated words/phrases of the confidential words/phrases. Then, a translated text D shown in FIG. 11B is generated.

2-7. Seventh Modified Example

In the above-described exemplary embodiment, "#" is used as a reserved word. However, a reserved word may be determined for each processing, for example, for each original text to be processed. In this case, the image processing apparatus 100 may execute alternative word/phrase check processing S4 indicated by the broken lines in FIG. 3, and the non-volatile storage section 1501 may store therein a reserved word list L1 indicated by the broken lines in FIG. 2.

Figures 12, 13:
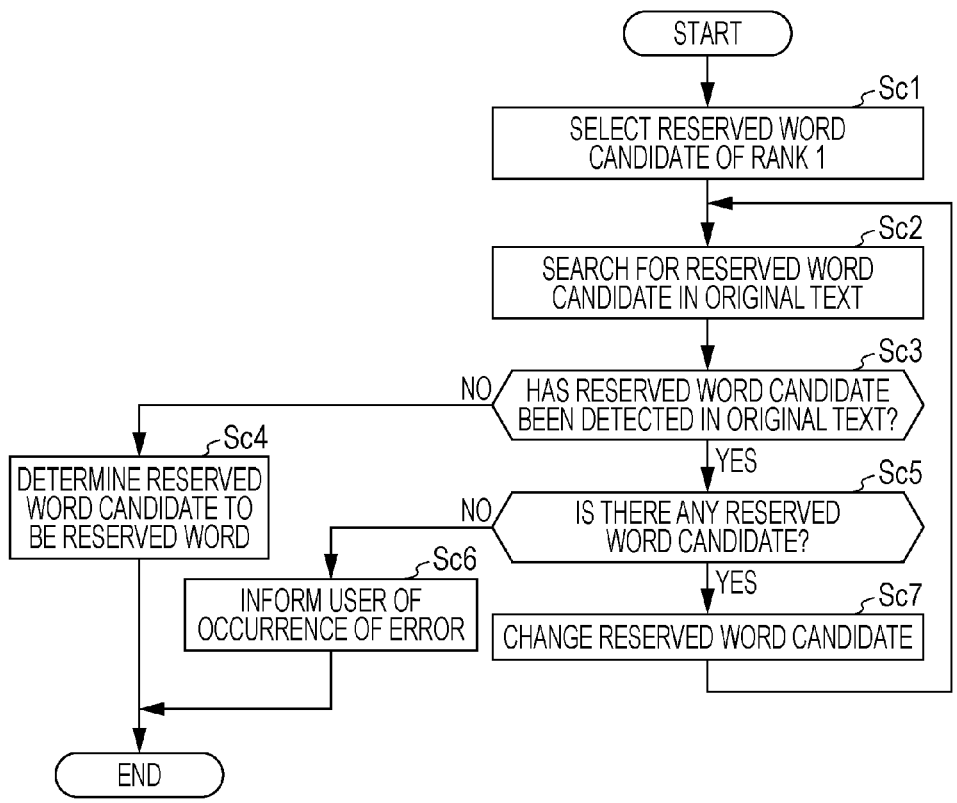
FIG. 12 is a flowchart illustrating alternative word/phrase check processing executed by an image processing apparatus.
FIG. 13 illustrates an example of a reserved word list stored in a non-volatile storage section.

FIG. 12 is a flowchart illustrating alternative word/phrase check processing S4 executed by the image processing apparatus 100. FIG. 13 illustrates an example of the reserved word list L1 stored in the non-volatile storage section 1501. In the reserved word list L1, candidates for a character string that may be used as a reserved word, such as "#" and "##", are stored according to priority. In step Sc1, the controller 130 selects a reserved word candidate having the highest priority, that is, rank 1, from the reserved word list L1. Then, in step Sc2, the controller 130 searches for a reserved word candidate included in an original text A. The controller 130 then determines in step Sc3 whether a reserved word candidate has been detected in the original text A. If the result of step Sc3 is NO, the process proceeds to step Sc4. In step Sc4, the controller 130 determines the reserved word candidate selected in step Sc1 to be a reserved word, and then terminates alternative word/phrase check processing S4. That is, alternative word/phrase check processing S4 is an example of processing for specifying a reserved word, which is a character string that is not included in document data (first document data) representing the original text A.

After executing alternative word/phrase check processing S4, the controller 130 starts confidential word/phrase substitute processing S1, as shown in FIG. 3, and the reserved word determined in step Sc4 is used as an alternative word/phrase to be written into the substitute table T1 in confidential word/phrase substitute processing S1.

If it is determined in step Sc3 that a reserved word candidate has been detected in the original text A, the process proceeds to step Sc5. The controller 130 determines in step Sc5 whether there is another reserved word candidate stored in the reserved word list L1. If the result of step Sc5 is NO, the process proceeds to step Sc6. In step Sc6, the controller 130 informs a user of the occurrence of an error, and terminates the processing. In this case, the controller 130 does not proceed to confidential word/phrase substitute processing S1 and terminates the entire processing.

In contrast, if it is determined in step Sc5 that there is another reserved word candidate stored in the reserved word list L1, the process proceeds to step Sc7. In step Sc7, the controller 130 determines one of the reserved word candidates stored in the reserved word list L1 to be a new reserved word candidate. The process then returns to step Sc2. The controller 130 repeats steps Sc2 through Sc7 until a reserved word candidate which never appears in the original text A is found in the reserved word list L1.

In the above-described modified example, the reserved word list L1 is stored in the non-volatile storage section 1501. The following rule may be adopted for generating a reserved word. If a character string "#" is not suitable as a reserved word, a character string "##", which are obtained by repeating "#" twice, is used as a new reserved word candidate, and, in this manner, a character string is created by increasing the number of times "#" is repeated until such a character string is determined to be a suitable reserved word. In this case, the reserved word list L1 is not necessary, and an error does not occur since there are theoretically an infinite number of reserved word candidates.

FIGS. 14A through 14C illustrate an example of an influence produced on a sending text B if alternative word/phrase check processing S4 is not executed. FIG. 14A illustrates an example of an original text A in which "#" is included in a zone Z1. In this state, if confidential word/phrase substitute processing S1 is performed by using "#" as a reserved word without executing alternative word/phrase check processing S4, the sending text B shown in FIG. 14B is generated. That is, a confidential word/phrase "ABC Ltd." included in the original text A is replaced by "#3" in the sending text B, while "#3" in the zone Z1 included in the original text A in the first place remains the same. As a result, in the sending text B, it is not possible to distinguish a zone Z2 in which the substitute alternative word/phrase "#3" is included from the zone Z1 in which "#3" has been included before executing confidential word/phrase substitute processing S1. Then, the diagnosis server 200 performs diagnosis processing on this sending text B, and since "#3" is not influenced by diagnosis processing, both of "#3" in the zone Z1 and "#3" in the zone Z2 remain the same in the received text C.

Then, the image processing apparatus 100 performs alternative word/phrase substitute processing S3 on the received text C subjected to diagnosis processing. Both of "#3" in the zone Z1 and "#3" in the zone Z2 in the received text C are replaced by "ABC Ltd.". Accordingly, in the diagnosed text D, an incorrect word/phrase "ABC Ltd." is indicated in the zone Z1.

In contrast, if alternative word/phrase check processing S4 is executed, a reserved word "#" is determined to be unsuitable in the original text A shown in FIG. 14A and is thus excluded from reserved word candidates. Then, it is checked whether a reserved word candidate "##" having the second highest priority, that is, rank 2, is included in the original text A. In this manner, a reserved word candidate which never appears in the original text A is determined to be a reserved word. In this case, it is assumed that "%", which is a reserved word candidate having the third highest priority, that is, rank 3, in the reserved word list L1 is determined to be a reserved word. Then, when the controller 130 performs confidential word/phrase substitute processing S1, confidential words/phrases included in the original text A are replaced by alternative words/phrases including the reserved word "%". As a result, the sending text B shown in FIG. 14C is generated. In the sending text B, "#3" is indicated in the zone Z1, while "%3" is indicated in the zone Z2, and thus, the zones Z1 and Z2 can be distinguished from each other.

2-8. Eighth Modified Example

In the above-described exemplary embodiment and modified examples, an alternative word/phrase is a character string constituted by a reserved word and a serial number, which is a symbol without any meaning as a language. However, an alternative word/phrase may be a general word/phrase with a meaning. In this case, an alternative word/phrase may be changed to another word/phrase (alternative word/phrase) by a server device.

A description will now be given of an information processing system 1b, which is a modified example of the information processing system 1 of the exemplary embodiment. Elements in this modified example are designated by reference numerals expressed by adding "b" to like reference numerals of the corresponding elements of the exemplary embodiment. In this modified example, an image processing apparatus 100b requests an external server device to perform translation processing.

FIG. 15 illustrates an example of a substitute rule base R1b in this modified example. Unlike the substitute rule base R1 in the exemplary embodiment, in the substitute rule base R1b in this modified example, plural candidates for alternative words/phrases are prepared for conditions for specifying confidential words/phrases, and translated words/phrases of alternative words/phrases are associated with the candidates for the alternative words/phrases. For example, in the substitute rule base R1b shown in FIG. 15, conditions that a character string which matches any one of "*sama", "*dono", "SUZUKI", or "SATO ICHIRO" is a confidential word/phrase are determined. In association with these conditions, candidates for alternative words/phrases, such as "ABE-san", "KATO-san", "SATO-san", and "TANAKA-san", are prepared. Then, translated words/phrases, such as "Mr. ABE", "Mr. KATO", "Mr. SATO", and "Mr. TANAKA", are associated with these candidates for alternative words/phrases. In the substitute rule base R1b, conditions and candidates for alternative words/phrases are determined so that, for a word/phrase representing a price, such as "$1,200" or "$12,345,678", a combination of a random price and a unit may be determined as an alternative word/phrase.

FIG. 16 illustrates an example of a word/phrase table T11b included in a substitute table T1b in this modified example. The substitute table T1b in this modified example corresponds to the substitute table T1 in the exemplary embodiment. The substitute table T1b includes an original text name list T10b corresponding to the original text name list T10 and a word/phrase table T11b generated for each of the original text names described in the original text name list T10b. The word/phrase table T11b is a set of records, each including a field of "confidential word/phrase" detected from the original text A on the basis of the substitute rule base R1b, a field of "alternative word/phrase" which replaces a confidential word/phrase, a field of "translated word/phrase of alternative word/phrase", which is a word/phrase translated from an alternative word/phrase, and a field of "corresponding word/phrase", which is a translated word/phrase of a confidential word/phrase.

Figure 17:
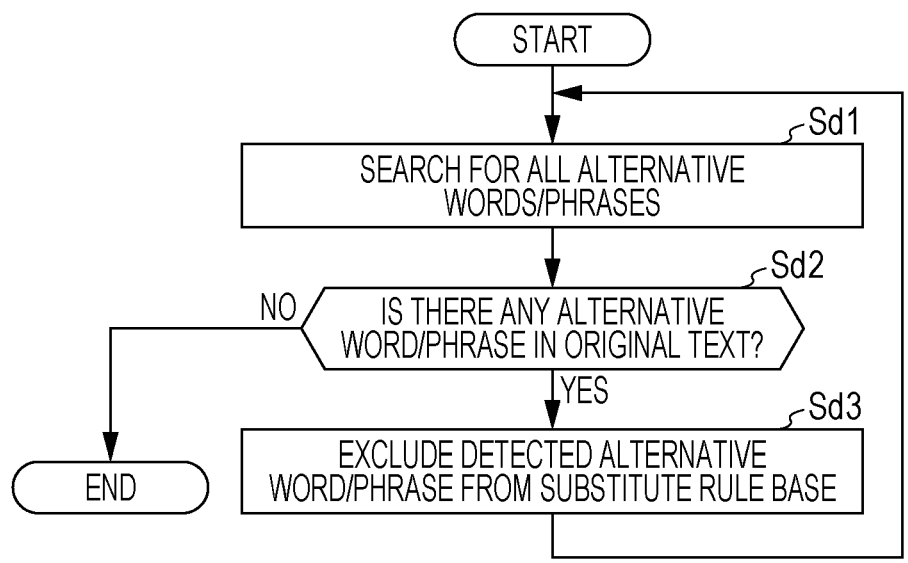
FIG. 17 is a flowchart illustrating alternative word/phrase check processing in a modified example.

FIG. 17 is a flowchart illustrating alternative word/phrase check processing S4 in this modified example. In step Sd1, the controller 130b copies the substitute rule base R1b stored in a non-volatile storage section 1501b into a volatile storage section 1500b, and searches the original text A for all alternative words/phrases stored in this substitute rule base R1b. Then, in step Sd2, the controller 130b determines whether any one of the alternative words/phrases has been detected in the original text A. If the result of step Sd2 is NO, the controller 130b terminates alternative word/phrase check processing S4. If it is determined in step Sd2 that any one of the alternative words/phrases described in the substitute rule base R1b has been detected in the original text A, the process proceeds to step Sd3. In step Sd3, the controller 130b excludes the detected alternative words/phrase from the substitute rule base R1b in the volatile storage section 1500b or rewrites a flag (not shown) and nullifies such an alternative word/phrase.

Figure 18:
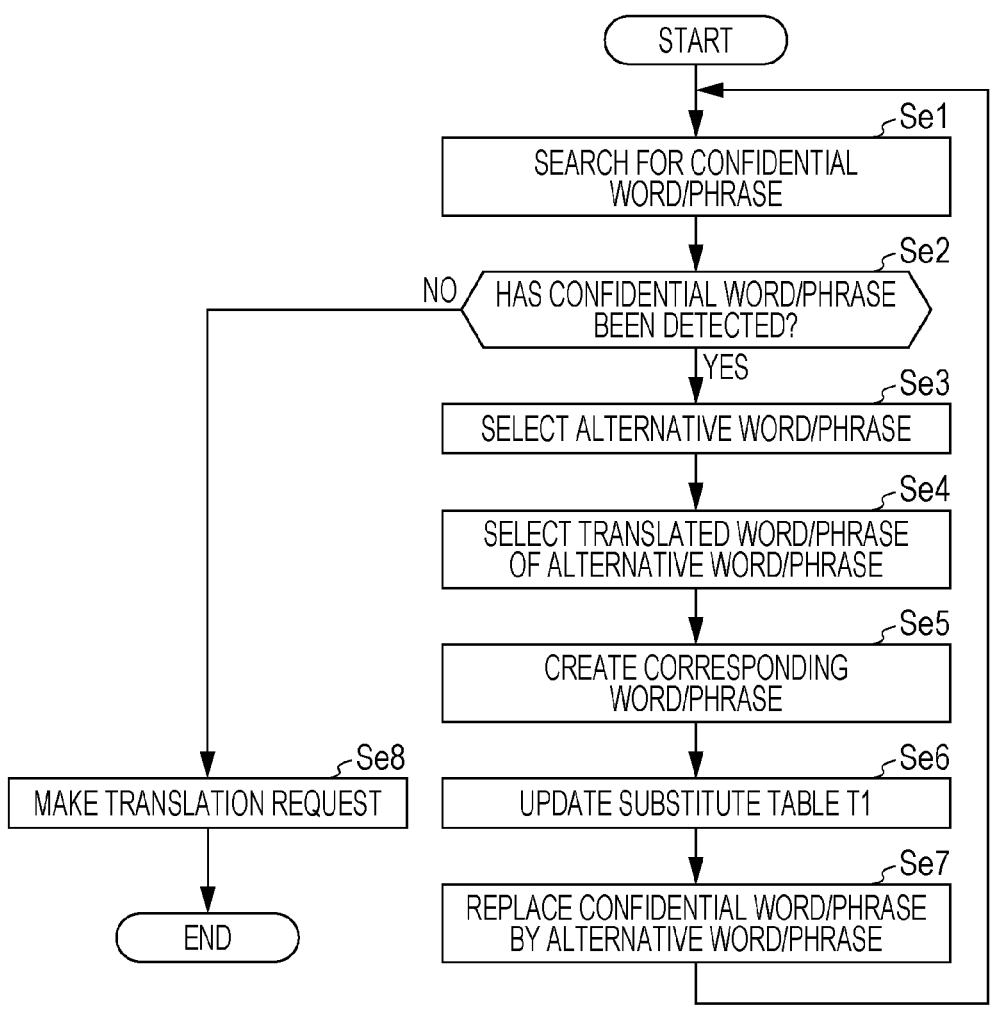
FIG. 18 is a flowchart illustrating confidential word/phrase substitute processing in a modified example.
Figure 19A:
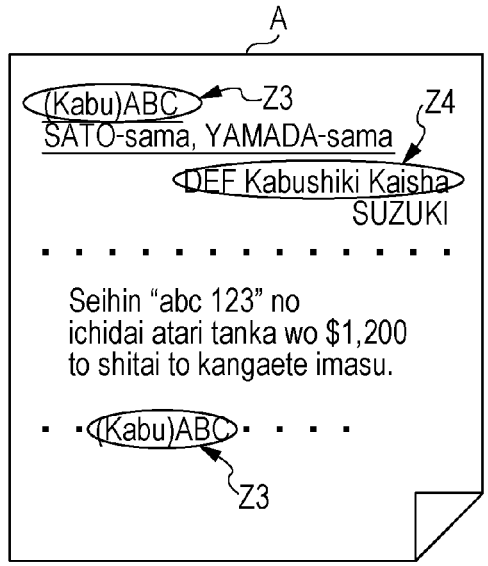
FIGS. 19A through 19D illustrate how an original text changes as a result of executing confidential word/phrase substitute processing.

FIG. 18 is a flowchart illustrating confidential word/phrase substitute processing S1 in this modified example. FIGS. 19A through 19D illustrate how an original text changes as a result of executing confidential word/phrase substitute processing S1. FIG. 19A illustrates an example of the original text A which has not been subjected to confidential word/phrase substitute processing S1.

In step Se1, the controller 130b searches for a confidential word/phrase included in the original text A shown in FIG. 19A. The controller 130b then determines in step Se2 whether a confidential word/phrase has been detected in the original text A. If the result of step Se2 is NO, the process proceeds to step Se8. In step Se8, the controller 130b sends document data indicating the original text A to the translation server 200b as a sending text B, and requests the translation server 200b to perform translation processing on this sending text B.

On the other hand, if it is determined in step Se2 that a confidential word/phrase has been detected, the process proceeds to step Se3. In step Se3, the controller 130b stores this confidential word/phrase in the volatile storage section 1500b. The controller 130b then selects an alternative word/phrase associated with this confidential word/phrase from among candidates prepared in the substitute rule base R1b stored in the non-volatile storage section 1501b, and stores the selected alternative word/phrase in the volatile storage section 1500b. For example, the controller 130b selects "JKL Kabushiki Kaisha" as an alternative word/phrase for the above-described confidential word/phrase "(Kabu)ABC".

Since the above-described alternative word/phrase check processing S4 has been executed prior to confidential word/phrase substitute processing S1, all words/phrases which appear in the original text A have been excluded from candidates for alternative words/phrases indicated in the substitute rule base R1b. That is, an alternative word/phrase, such as "JKL Kabushiki Kaisha", selected in step Se3 is not included in the original text A.

Then, in step Se4, the controller 130b creates a translated word/phrase of the selected alternative word/phrase by referring to a dictionary (not shown), and stores the translated word/phrase in the volatile storage section 1500b. For example, the controller 130b creates "JKL Incorporated Company" as a translated word/phrase of this alternative word/phrase "JKL Kabushiki Kaisha" by referring to a dictionary (not shown).

Then, in step Se5, the controller 130b creates a translated word/phrase of the detected confidential word/phrase as a corresponding word/phrase, and temporarily stores the created corresponding word/phrase in the volatile storage section 1500b. For example, the controller 130b creates "ABC Ltd." for the confidential word/phrase "(Kabu)ABC" as a corresponding word/phrase by referring to a dictionary. The controller 130b may query a user of the image processing apparatus 100b about a translated word/phrase of the confidential word/phrase and may utilize an obtained word/phrase responded from the user as a corresponding word/phrase.

Then, in step Se6, the controller 130b associates the confidential word/phrase, the alternative word/phrase, the translated word/phrase of the alternative word/phrase, and the corresponding word/phrase, which are temporarily stored in the volatile storage section 1500b, with one another as a new record, and adds the new record to the word/phrase table T11b of the substitute table T1b, thereby updating the substitute table T1b. That is, "(Kabu)ABC", "JKL Kabushiki Kaisha", "JKL Incorporated Company", and "ABC Ltd." are written into the corresponding fields of a new record in the word/phrase table T11b associated with the original text name of the original text A.

Then, in step Se7, in accordance with the new record stored in the word/phrase table T11b associated with the original text A, the controller 130b replaces the confidential word/phrase included in the original text A by the alternative word/phrase in the new record. That is, the controller 130b replaces "(Kabu)ABC" by "JKL Kabushiki Kaisha".

After executing substitute processing in step Se7, the routine returns to step Se1. The controller 130b then searches for another confidential word/phrase in the document data indicating the original text A in which the detected confidential word/phrase has been replaced by the alternative word/phrase. Every time a confidential word/phrase has been detected in step Se2, the controller 130b executes steps Se3 through Se7. If substitute processing has been executed on all the confidential words/phrases, that is, if the result of step Se2 is NO, the process proceeds to step Se8. In step Se8, the image processing apparatus 100b sends the substituted text to the translation server 200b as a sending text B. An example of the sending text B generated by executing confidential word/phrase substitute processing S1 is shown in FIG. 19D.

FIGS. 19A through 19D illustrate an example of an influence produced on a sending text B if alternative word/phrase check processing S4 is not executed. In the original text A shown in FIG. 19A, "(Kabu)ABC" is indicated in a zone Z3 and "DEF Kabushiki Kaisha" is indicated in a zone Z4. In this state, when the controller 130b performs confidential word/phrase substitute processing S1, "(Kabu)ABC", which is a confidential word/phrase, is replaced by "JKL Kabushiki Kaisha" as an alternative word/phrase, and "DEF Kabushiki Kaisha", which is a confidential word/phrase, is replaced by "GHI Kabushiki Kaisha" as an alternative word/phrase, as shown in the word/phrase table T11b in FIG. 16. In this case, it is assumed that alternative word/phrase check processing S4 is not performed. In this case, since "DEF Kabushiki Kaisha" is included in the substitute rule base R1b as a candidate for an alternative word/phrase, as shown in FIG. 15, it is possible that the controller 130b may select "DEF Kabushiki Kaisha" as an alternative word/phrase for the confidential word/phrase "(Kabu)ABC" when creating the word/phrase table T11b.

Figure 19B:
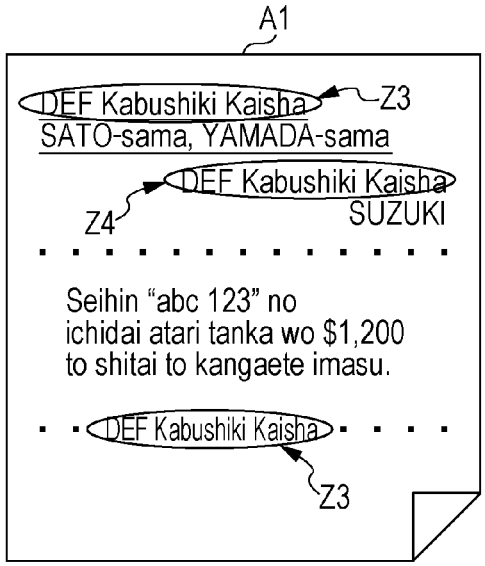
Figure 19C:
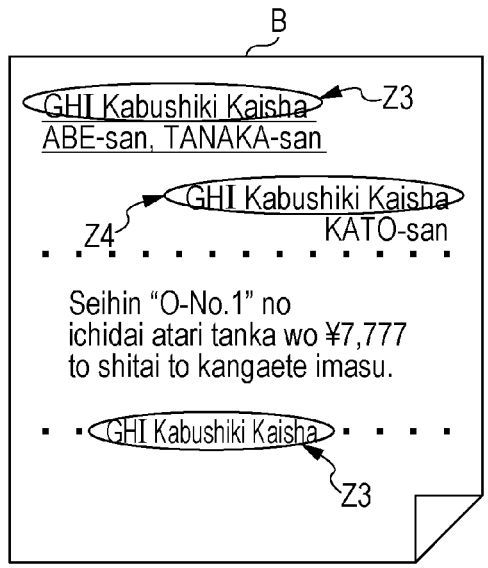
Figure 19D:
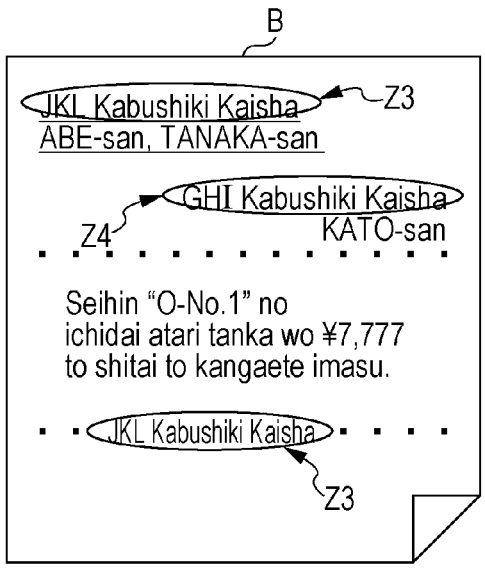

Then, when the word/phrase table T11b of the substitute table T1b is created, if the replacement of "(Kabu)ABC" is performed prior to the replacement of "DEF Kabushiki Kaisha", "DEF Kabushiki Kaisha" may be indicated in both of a zone Z3 and a zone Z4 in data A1, as shown in FIG. 19B. Then, if the replacement of "DEF Kabushiki Kaisha", which is a confidential word/phrase, is performed on the data A1, both of the zone Z3 and the zone Z4 are replaced by "GHI Kabushiki Kaisha" since it is not possible to distinguish the zone Z3 and the zone Z4 from each other. As a result, the sending text B shown in FIG. 19C may be generated.

In contrast, if alternative word/phrase check processing S4 is executed, a word/phrase which appears in the original text A is excluded from candidates for alternative words/phrases indicated in the substitute rule base R1b. That is, when alternative word/phrase check processing S4 is executed on the original text A including "DEF Kabushiki Kaisha", "DEF Kabushiki Kaisha" is excluded from candidates for alternative words/phrases indicated in the substitute rule base R1b. As a result, "DEF Kabushiki Kaisha" is not included in the word/phrase table T11b as an alternative word/phrase. Then, the zone Z3 and the zone Z4 can be distinguished from each other, and the sending text B shown in FIG. 19D is generated. Upon receiving this sending text B from the image processing apparatus 100b, the translation server 200b performs translation processing on the sending text B, and sends the translated text to the image processing apparatus 100b.

Figures 20, 21A, 21B:
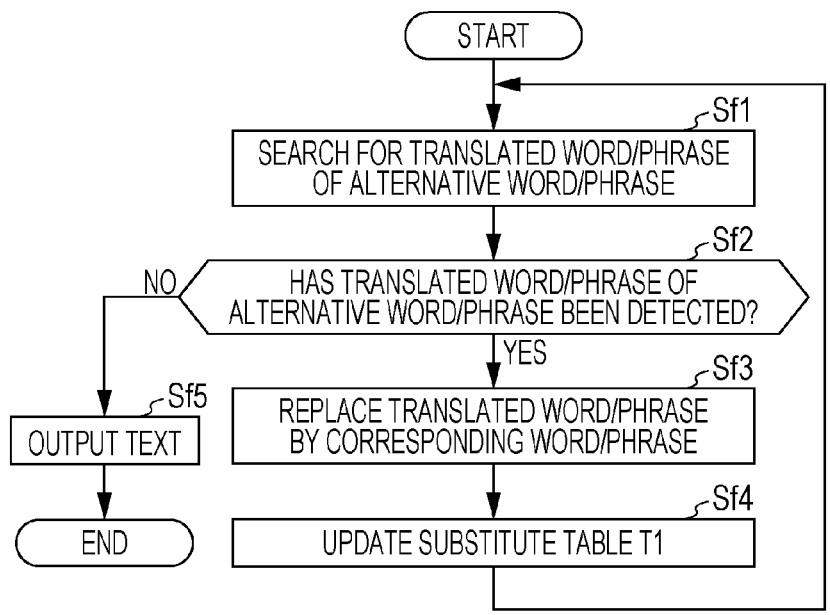
FIG. 20 is a flowchart illustrating alternative word/phrase substitute processing in a modified example.
FIGS. 21A and 21B illustrate how a translated text changes as a result of executing alternative word/phrase substitute processing.

Alternative word/phrase substitute processing S3 will now be described below. FIG. 20 is a flowchart illustrating alternative word/phrase substitute processing S3 in this modified example. FIGS. 21A and 21B illustrate how a translated text changes as a result of executing alternative word/phrase substitute processing S3. Upon receiving document data which indicates a translated text from the translation server 200b, the image processing apparatus 100b stores this document data in the volatile storage section 1500b as a received text C. Then, the controller 130b of the image processing apparatus 100b reads the document data indicating the received text C from the volatile storage section 1500b, and performs alternative word/phrase substitute processing S3 shown in FIG. 20. In this modified example, a case in which alternative word/phrase substitute processing S3 is performed after document data indicating the received text C shown in FIG. 21A has been received and stored in the volatile storage section 1500b will be discussed.

In step Sf1, the controller 130b first searches the document data indicating the received text C for each of the translated words/phrases of alternative words/phrases stored in the specified word/phrase table T11b of the substitute table T1b. It is then determined in step Sf2 whether any of the translated words/phrases of alternative words/phrases has been detected. If the result of step Sf2 is NO, the controller 130b terminates alternative word/phrase substitute processing, and then proceeds to step Sf5. In step Sf5, the controller 130b stores the document data in the volatile storage section 1500b as a translated text D and outputs it. Images of the document data representing the translated text D output from the controller 130b are formed on a sheet (medium) by the image forming unit 120b, and then, the images formed on the sheet (medium) are output.

On the other hand, if at least one of the translated words/phrases of alternative words/phrases stored in the word/phrase table T11b of the substitute table T1b is included in the document data, the operation is performed in the following manner. In the example shown in FIG. 21A, there is a word/phrase "Mr. ABE" that is included in the received text C, and "Mr. ABE" is stored in the word/phrase table T11b as one of the translated words/phrases of alternative words/phrases. Accordingly, in step Sf2, the controller 130b detects "Mr. ABE" as one of the translated words/phrases of alternative words/phrases. Then, in step Sf3, the controller 130b replaces the detected translated word/phrase by an associated confidential word/phrase stored in the word/phrase table T11b. That is, the controller 130b replaces "Mr. ABE" appearing in the translated text by "Mr. SATO". Then, in step Sf4, the controller 130b updates the word/phrase table T11b by deleting a record including the translated word/phrase which has been replaced by the confidential word/phrase from the word/phrase table T11b. Thereafter, every time a translated word/phrase of an alternative word/phrase is detected in step Sf2, steps Sf3 and Sf4 are executed.

If all the translated words/phrases for alternative words/phrases have been subjected to steps Sf3 and Sf4, that is, if the result of step Sf2 is NO, the controller 130b terminates alternative word/phrase substitute processing S3, and then proceeds to step Sf5. The controller 130*b* stores the document data in the volatile storage section 1500*b* as a translated text D and outputs it. Images of the document data representing the translated text D output from the controller 130*b* are formed on a sheet (medium) by the image forming unit 120*b*, and then, the images formed on the sheet (medium) are output. In this case, the translated text D is printed and output, as shown in FIG. 21B, by the image processing apparatus 100*b*.

As discussed above, by executing alternative word/phrase check processing S4, words/phrases which appear in the original text A are excluded from candidates for alternative words/phrases indicated in the substitute rule base R1*b*. Accordingly, in a sending text B generated as a result of performing confidential word/phrase substitute processing S1, replaced words/phrases can be distinguished from words/phrases included in the original text A in the first place. Even after the sending text B has been subjected to translation processing by the translation server 200*b*, the replaced words/phrases and the original words/phrases can be distinguished from each other in a translated text. Thus, the image processing apparatus 100*b* is able to generate a correct translated text D on the basis of a received text C.

2-9. Ninth Modified Example

In the above-described sixth modified example, the controller 130*a* writes corresponding words/phrases associated with confidential words/phrases in the word/phrase table T11*a* of the substitute table T1*a*. However, corresponding words/phrases may be determined in accordance with the type of processing requested by the image processing apparatus 100*a*. For example, if the image processing apparatus 100*a* requests a server device to perform processing concerning "translation from Japanese into English", corresponding words/phrases are set to be English words/phrases associated with Japanese confidential words/phrases. If the image processing apparatus 100*a* requests a server device to perform processing concerning "translation from Japanese into Chinese", corresponding words/phrases are set to be Chinese words/phrases associated with Japanese confidential words/phrases. If the image processing apparatus 100*a* requests a server device to perform difference processing or statistical processing discussed above, corresponding words/phrases may be set to be confidential words/phrases themselves.

In this case, the image processing apparatus 100*a* may select an external server device in accordance with the type of processing to be executed. Additionally, the image processing apparatus 100*a* may instruct an external server device which type of processing to be executed and may cause the external server device to perform the instructed type of processing.

The security level may be set for each processing requested by the image processing apparatus 100*a*, and then, the above-described level of confidentiality may be associated with the security level. The security level may be set for each type of processing, each server device which executes processing, or each communication line through which the image processing apparatus 100*a* communicates with a server device.

In this case, if the domain name or the subnet mask of a server device is the same as that of the image processing apparatus 100*a*, processing performed by such a server device may be assumed to be secure, and the level of confidentiality may be set to be low or confidential word/phrase substitute processing may not be performed. If an encryption protocol, such as SSL (Secure Sockets Layer), is used for a communication line, processing performed through such a communication line may be assumed to be secure, and the level of confidentiality may be set to be low or confidential word/phrase substitute processing may not be performed.

2-10. Tenth Modified Example

Each program executed by the controller 130 may be provided in a state in which it is recorded on a computer-readable recording medium, such as a magnetic recording medium, for example, magnetic tape or a magnetic disk, an optical recording medium, for example, an optical disc, a magneto-optical recording medium, or a semiconductor memory. The program may be downloaded via a network, such as the Internet. The controller 130 is not restricted to a CPU, and various other devices, for example, a dedicated processor, may be used.

2-11. Eleventh Modified Example

In the above-described exemplary embodiment and modified examples, the server devices (diagnosis server 200 and translation servers 200*a* and 200*b*) are external devices that communicate with the image processing apparatus 100, 100*a*, and 100*b* via the Internet 300. However, the image processing apparatus 100, 100*a*, or 100*b* may have the functions of a server device. In this case, the image processing apparatus 100, 100*a*, or 100*b* processes a sending text B and creates a received text C by itself. Accordingly, the image processing apparatus 100, 100*a*, or 100*b* does not have to send the sending text B to a server device nor does it have to receive the received text C.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   at least one memory comprising computer executable instructions;
   at least one processor configured to read and execute the computer executable instructions, the computer executable instructions causing the processor to perform:
   first replacing, in first document data including a plurality of character strings, a first character string which satisfies a predetermined condition with a second character string including a character string which is not included in the first document data so as to generate second document data;
   obtaining a processing result generated by performing translation processing on the second document data to translate the second document data from a first language to a second language; and
   second replacing the second character string included in the processing result with a character string translated from the first character string,
   wherein the first character string is translated from the first language to the second language.

2. The information processing apparatus according to claim 1, wherein the computer executable instructions further cause the processor to perform:
   requesting a server device to process the second document data, wherein the requesting instructs the server device not to change the second character string, and the obtaining obtains a processing result generated by processing the second document data by the server device.

3. The information processing apparatus according to claim 1, wherein the first replacing generates a character string which is not included in the first document data and which is not changed by processing the second document data, and replaces the first character string by the generated character string.

4. The information processing apparatus according to claim 1, wherein the computer executable instructions causing the processor to perform:
selecting a server device in accordance with a type of processing to be executed, wherein the second replacing determines a character string corresponding to the first character string in accordance with the type of processing executed by the server device selected by the selecting.

5. The information processing apparatus according to claim 2, wherein the computer executable instructions causing the processor to perform:
selecting a server device in accordance with a type of processing to be executed, wherein the second replacing determines a character string corresponding to the first character string in accordance with the type of processing executed by the server device selected by the selecting.

6. The information processing apparatus according to claim 3, wherein the computer executable instructions causing the processor to perform:
selecting a server device in accordance with a type of processing to be executed, wherein the second replacing determines a character string corresponding to the first character string in accordance with the type of processing executed by the server device selected by the selecting.

7. The information processing apparatus according to claim 1, wherein the computer executable instructions causing the processor to perform:
instructing a server device which type of processing to be executed,
wherein the second replacing determines a character string corresponding to the first character string in accordance with a type of processing instructed by the instructing.

8. The information processing apparatus according to claim 2, wherein the computer executable instructions causing the processor to perform:
instructing the server device which type of processing to be executed,
wherein the second replacing determines a character string corresponding to the first character string in accordance with a type of processing instructed by the instructing.

9. The information processing apparatus according to claim 3, wherein the computer executable instructions causing the processor to perform:
instructing a server device which type of processing to be executed,
wherein the second replacing determines a character string corresponding to the first character string in accordance with a type of processing instructed by the instructing.

10. An image processing apparatus comprising:
an information processing apparatus including:
at least one memory comprising computer executable instructions;
at least one processor configured to read and execute the computer executable instructions, the computer executable instructions causing the processor to perform:
first replacing that replaces, in first document data including a plurality of character strings, a first character string which satisfies a predetermined condition with a second character string including a character string which is not included in the first document data so as to generate second document data,
obtaining a processing result generated by performing translation processing on the second document data to translate the second document data from a first language to a second language, and
second replacing that replaces the second character string included in the processing result with a character string corresponding to the first character string; and
an image forming unit that forms, on a medium, an image indicating a processing result obtained by replacing the second character string by a character string translated from the first character string by the second replacing,
wherein the first character string is translated from the first language to the second language.

11. An information processing system comprising:
a server device that processes data; and
an information processing apparatus that sends data to the server device and receives data processed by the server device, the information processing apparatus including:
at least one memory comprising computer executable instructions;
at least one processor configured to read and execute the computer executable instructions, the computer executable instructions causing the processor to perform:
first replacing that replaces, in first document data including a plurality of character strings, a first character string which satisfies a predetermined condition with a second character string including a character string which is not included in the first document data so as to generate second document data,
obtaining a processing result generated by performing translation processing on the second document data to translate the second document data from a first language to a second language, and
second replacing that replaces the second character string included in the processing result with a character string translated from the first character string,
wherein the first character string is translated from the first language to the second language.

* * * * *